(12) United States Patent
Harris

(10) Patent No.: US 11,302,181 B2
(45) Date of Patent: Apr. 12, 2022

(54) METHODS AND SYSTEMS FOR ENHANCING VEHICLE DATA ACCESS CAPABILITIES

(71) Applicant: TOYOTA MOTOR NORTH AMERICA, INC., Plano, TX (US)

(72) Inventor: Randall M. Harris, Dallas, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 0 days.

(21) Appl. No.: 16/931,138

(22) Filed: Jul. 16, 2020

(65) Prior Publication Data
US 2022/0020268 A1 Jan. 20, 2022

(51) Int. Cl.
*G08G 1/01* (2006.01)
*G06Q 20/36* (2012.01)

(52) U.S. Cl.
CPC ......... *G08G 1/0141* (2013.01); *G06Q 20/363* (2013.01)

(58) Field of Classification Search
CPC .......................... G08G 1/0141; G06Q 20/363
See application file for complete search history.

(56) References Cited

U.S. PATENT DOCUMENTS

| | | | | |
|---|---|---|---|---|
| 9,000,903 | B2* | 4/2015 | Bowers | G06Q 40/08 340/436 |
| 9,403,482 | B2* | 8/2016 | Shahraray | B60R 1/00 |
| 9,866,782 | B2* | 1/2018 | Shahraray | B60R 1/00 |
| 10,118,612 | B2* | 11/2018 | Westover | B60W 10/20 |
| 10,242,509 | B2* | 3/2019 | Throop | G07C 5/008 |
| 10,375,545 | B2 | 8/2019 | Yukizaki et al. | |
| 10,783,586 | B1* | 9/2020 | Augustine | G06Q 40/08 |
| 10,795,909 | B1* | 10/2020 | Bond | G06F 16/904 |
| 2003/0187571 | A1* | 10/2003 | Impson | G07C 5/008 701/117 |
| 2008/0018448 | A1* | 1/2008 | Ghabra | B60C 23/0462 340/447 |
| 2009/0228172 | A1* | 9/2009 | Markyvech | G01S 5/0072 701/36 |

(Continued)

FOREIGN PATENT DOCUMENTS

| | | |
|---|---|---|
| CN | 108592933 A | 9/2018 |
| CN | 110020915 A | 7/2019 |

(Continued)

OTHER PUBLICATIONS

Extended European Search Report from corresponding EP Application No. 21185869.1; dated Dec. 14, 2021; 10 pgs.

*Primary Examiner* — Joseph H Feild
*Assistant Examiner* — Rufus C Point
(74) *Attorney, Agent, or Firm* — Dinsmore Shohl LLP

(57) ABSTRACT

A method for enhancing data access capabilities of vehicles is provided. The method includes obtaining, by a first vehicle having a first level of autonomy, data in a first format, receiving, from a second vehicle having a second level of autonomy, a request for the data, converting the data from a first format to a second format based on the second level of autonomy, and transmitting the data in the second format to the second vehicle. The data in the second format is compatible with the second level of autonomy. The second level of autonomy is lower than the first level of autonomy.

14 Claims, 5 Drawing Sheets

(56) References Cited

U.S. PATENT DOCUMENTS

| | | | | |
|---|---|---|---|---|
| 2012/0086582 | A1* | 4/2012 | Durekovic | G08G 1/161 340/903 |
| 2013/0030642 | A1* | 1/2013 | Bradley | G07C 5/085 701/32.2 |
| 2013/0158742 | A1* | 6/2013 | Cooper | B61L 27/0027 701/2 |
| 2013/0342333 | A1* | 12/2013 | Hutchings | G08B 25/10 340/435 |
| 2015/0145995 | A1* | 5/2015 | Shahraray | H04L 67/12 348/148 |
| 2016/0127514 | A1* | 5/2016 | Maksumov | H04L 41/0226 709/202 |
| 2016/0133131 | A1* | 5/2016 | Grimm | G08G 1/096725 701/117 |
| 2017/0160401 | A1* | 6/2017 | Lei | G01S 19/51 |
| 2017/0166219 | A1* | 6/2017 | Jammoussi | G08G 1/048 |
| 2018/0281796 | A1* | 10/2018 | Ravichandran | B60W 30/181 |
| 2019/0077272 | A1 | 3/2019 | Newman et al. | |
| 2019/0138007 | A1* | 5/2019 | Baghsorkhi | G08G 1/091 |
| 2019/0220037 | A1* | 7/2019 | Vladimerou | G05D 1/0088 |
| 2019/0306677 | A1* | 10/2019 | Basu | H04W 4/027 |
| 2019/0318631 | A1 | 10/2019 | Seaman et al. | |
| 2019/0331758 | A1* | 10/2019 | Malkes | G01S 5/021 |
| 2019/0354101 | A1* | 11/2019 | Sujan | G08G 1/22 |
| 2019/0355254 | A1 | 11/2019 | Seki et al. | |
| 2020/0133307 | A1 | 4/2020 | Kelkar et al. | |
| 2020/0262438 | A1* | 8/2020 | Bai | G08G 1/0112 |
| 2020/0312155 | A1* | 10/2020 | Kelkar | G08G 1/096758 |
| 2020/0351906 | A1* | 11/2020 | Chen | H04W 8/22 |
| 2020/0394205 | A1* | 12/2020 | Bond | G06F 16/252 |
| 2021/0026360 | A1* | 1/2021 | Luo | G06K 9/00805 |

FOREIGN PATENT DOCUMENTS

| | | |
|---|---|---|
| JP | 2004054412 A | 2/2004 |
| WO | 2019/120548 A1 | 6/2019 |

* cited by examiner

METHODS AND SYSTEMS FOR ENHANCING VEHICLE DATA ACCESS CAPABILITIES

TECHNICAL FIELD

The present specification relates to systems and methods for transferring data between vehicles, and more particularly, to obtaining data relating to traffic, navigation, and points of interest across large geographic areas, converting this data into formats compatible with vehicles having varied levels of autonomy, and transmitting the converted data to these vehicles.

BACKGROUND

Providing accurate real time data relating to traffic conditions, navigation, and points of interest across vast geographic areas is an important aspect of autonomous vehicle systems. Conventionally, the ability to access such data in real time was limited by the sensors installed in these vehicles and the functionalities of various components in these vehicles. Conventional systems lacked the ability to access traffic information involving dynamic and structured information, such as moving traffic flow, walking pedestrians, parking availability and hours of operation at venues, across vast geographic areas in real time. For example, vehicles having a low level of autonomy were unable to access such data because these vehicles lacked the sensors capable of acquiring such data. Further, vehicles having a low level of autonomy lacked the hardware and software functionalities to process such data even if such data was received from other devices.

Accordingly, a need exists for providing a method and system for enhancing the data access capabilities of vehicles so that these vehicles have real time access to data related to traffic conditions, navigation, and points of interest across vast geographic areas.

SUMMARY

The present disclosure provides systems and methods for enhancing the data access capabilities of vehicles. In embodiments, by enabling vehicles having a high level of autonomy to transmit real time data in formats that are compatible with the vehicles having a low level of autonomy in exchange for consideration, these systems and methods enhance the data access capabilities of vehicles with a low level of autonomy. According to the present disclosure, vehicles having a high level of autonomy may obtain data of traffic conditions, navigation, and points of interest across vast geographic areas using various sensors, e.g., image sensors, audio sensors, audio sensors, and the like. Alternatively or additionally, vehicles having a high level of autonomy may also obtain such data from other vehicles and/or one or more management servers (e.g., local server or remove server). These vehicles are configured to communicate with other vehicles and the management server via a wireless network.

In embodiments, upon receiving a query for data from a vehicle having a low level of autonomy, the vehicle having a high level of autonomy may search data obtained by various sensors, identify data pertinent to the query, convert the data into a format that is compatible with the format of the querying vehicle, and transmit the converted data to the querying vehicle. In embodiments, the vehicle having a high level of autonomy may receive a query and determine that it does not have data that is relevant to the received query. Consequently, the vehicle having a high level of autonomy may transmit the received query to other vehicles and/or one or more management servers, and receive numerous responses. In embodiments, one or more of these responses may include data pertinent to the initially received query.

The vehicle having a high level of autonomy may convert the pertinent data into a format that is compatible with and accessible by the querying vehicle (e.g., the vehicle having a low level of autonomy). The query may relate to, e.g., traffic conditions, navigation, and points of interest across vast geographic areas, which may now be accessible to the querying vehicle in real time. In this way, the capabilities of low level vehicles, is enhanced. Alternatively or additionally, vehicles having a high level of autonomy may readily share data related to traffic conditions and the like across vast geographic areas with other vehicles having a high level of autonomy, thereby enhancing the data access capabilities of these vehicles.

In one embodiment, a system for enhancing access capabilities between vehicles is provided. The system includes a first vehicle having a first level of autonomy and comprising a first controller and a first set of sensors. The first controller is configured to obtain data using the first set of sensors, receive a request for the data from a second vehicle, and transmit the data to the second vehicle in exchange for consideration transmitted by the second vehicle. The system further includes a second vehicle having a second level of autonomy. The second vehicle has a second controller and a second set of sensors. The second level of autonomy is lower than the first level of autonomy.

In another embodiment, a vehicle having a first level of autonomy is described. The vehicle includes a first set of sensors, and a controller that is configured to obtain data in a first format, receive a request from a second vehicle having a second level of autonomy, convert the data from a first format to a second format based on the second level of autonomy, and transmit data in the second format to the second vehicle. In addition, the second level of autonomy is lower than the first level of autonomy.

In yet another embodiment, a method for enhancing the data access capabilities of vehicles is described. The method includes obtaining, by a first vehicle having a first level of autonomy, data in a first format, receiving, from a second vehicle having a second level of autonomy, a request for the data, converting the data from the first format to a second format based on the second level of autonomy, and transmitting the data in the second format to the second vehicle in exchange for consideration transmitted by the second vehicle. The data in the second format is compatible with the second level of autonomy. In addition, the second level of autonomy is lower than the first level of autonomy.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Figure 1:
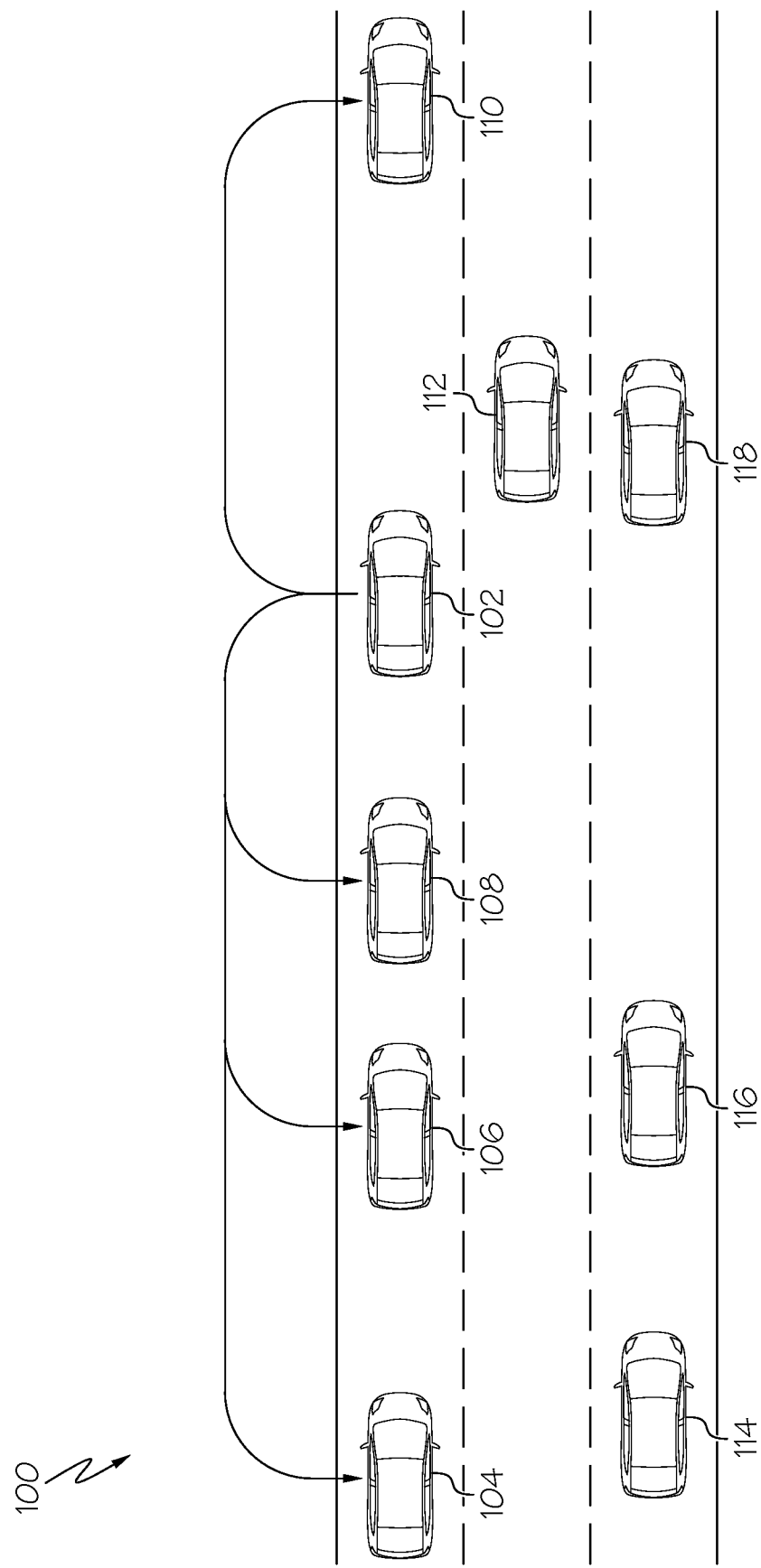
FIG. 1 schematically depicts a system including vehicles having a high level of autonomy and a low level of autonomy, which are configured to communicate data with each other via a wireless network, according to one or more embodiments shown and described herein.
Figure 4B:
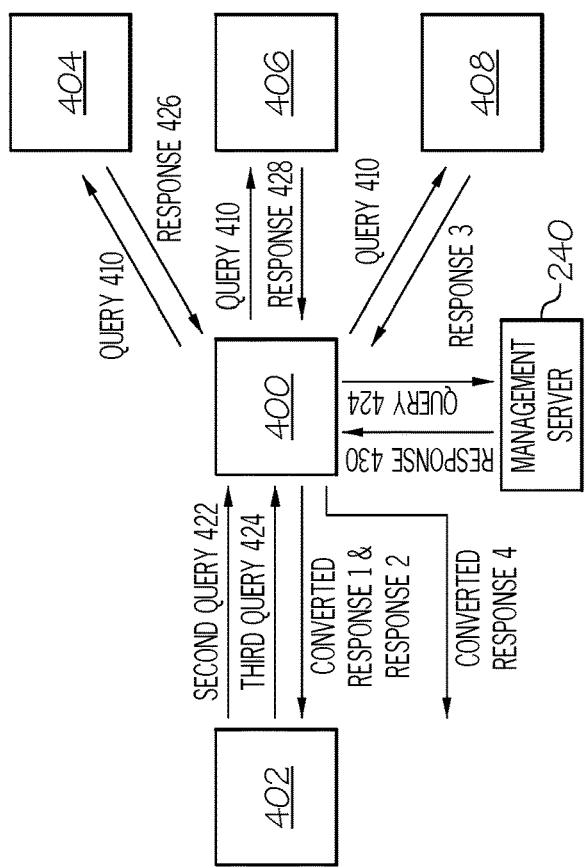
FIG. 4B depicts transmitting converted data from a first vehicle to a second vehicle in response to receiving multiple queries from the second vehicle, according to one or more embodiments shown or described herein.
Figure 4A:
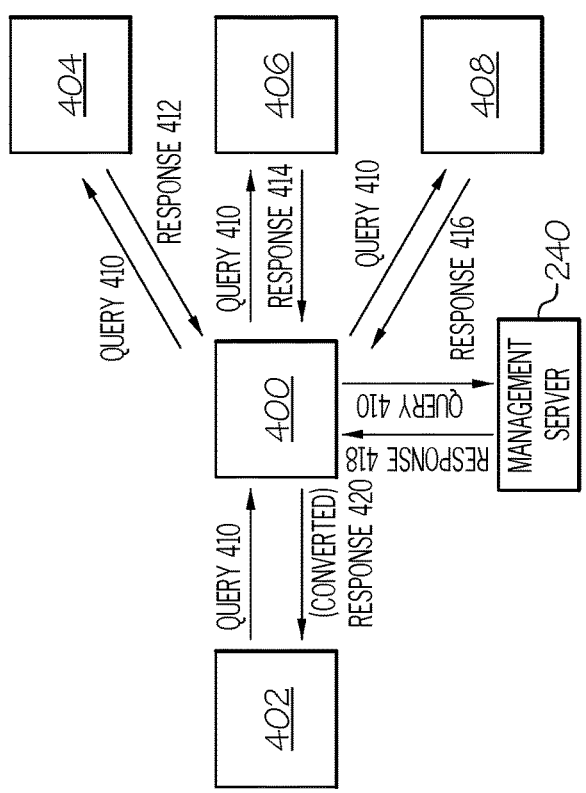
FIG. 4A depicts transmitting converted data from a first vehicle to a second vehicle in response to receiving a query from the second vehicle, according to one or more embodiments shown or described herein.

The embodiments disclosed herein include systems and methods for enhancing the data access capabilities of vehicles such that these vehicles have real time access to data related to traffic conditions, navigation, and points of interest across vast geographic areas. Specifically, enhancing the capabilities of vehicles includes transmitting data to vehicles in a format that is compatible with and accessible by the components of these vehicles. Referring to FIGS. 1, 4A, and 4B, the present system includes vehicles and a management server that are configured to communicate with each other via a wireless network. In embodiment depicted in FIG. 1, some of these vehicles have a high level of autonomy (e.g., vehicles 102, 104, 106, 108, and 110 in FIG. 1) while others have a low level of autonomy (e.g., vehicles 112, 114, 116, and 118 in FIG. 1). Vehicles having a high level of autonomy include sensors and components with functionalities that include, e.g., reading and writing data, capturing live video streams, live audio streams, and high-definition digital images, generating high definition three-dimensional mappings of various geographic areas, and the like. These vehicles may also have motion sensors, audio sensors, and the like. In contrast, vehicles having a low level of autonomy may have fewer sensors and components with limited capabilities and/or functionalities relative to the components of vehicles having a high level of autonomy. In embodiments, the vehicles having a low level of autonomy may only have motions sensors and audio sensors, and functionalities (e.g., one or more processors and/or a combination of hardware and software) that only facilitate the reading and writing of data.

In embodiments, as shown in FIG. 4A, a first vehicle 400 may receive a request for data from a second vehicle 402. In response, the first vehicle 400 may transmit the data to the second vehicle 402. The data transmitted by the first vehicle 400 to the second vehicle 402 may be in exchange for consideration transmitted by the second vehicle 402 to e.g., the first vehicle 400 and/or the management server 240. In embodiments, the consideration may be payment in the form of traditional currency (e.g., dollars, pounds sterling, euros, and the like) or digital currency (e.g., cryptocurrency such a bitcoin, litecoin, ethereum, and the like). Alternatively or additionally, the consideration may be payment in the form of a particular type of data that is transmitted from the second vehicle 402 to the first vehicle 400 in exchange for data received from the first vehicle 400.

In embodiments, as shown in FIG. 4A, a first vehicle 400 may receive a request for data (e.g., a query 410) from a second vehicle 402, which the first vehicle 400 may simultaneously or sequentially transmit to vehicles 404, 406, and 408, and the management server 240. Thereafter, one or more of the vehicles 404, 406, and 408, and the management server 240 may transmit responses 412, 414, 416, 418, and 420 respectively to first vehicle 400. The first vehicle 400 may identify data that is accurate and responsive to the query 410, convert this data from a first format into a second format based on the level of autonomy and functionalities of the second vehicle 402, and transmit the converted data to the second vehicle 402. In embodiments, the first vehicle 400 may have the data requested by the second vehicle 402 (e.g., via query 410), and as such, may not transmit the query to other vehicles. Instead, the first vehicle 400 may access data from memory, covert the data from a first format into a second format based on the level of autonomy and functionalities of the second vehicle 402, and transmit the converted data to the second vehicle 402.

According to the present disclosure, the system described herein enables communication of data related to traffic conditions, navigation, and points of interest across vast geographic areas in real time. In addition, the data is transmitted in a format that is accessible by and compatible with the capabilities and functionalities of various vehicles. The present system utilizes the capabilities and functionalities of vehicles having a high level of autonomy, namely sensors that are capable of capturing image data, live video stream data related to traffic conditions (e.g., roadblocks various points of interest, traffic jams, accidents, delays, and the like), navigation, various points of interest (theaters, malls, parking lots, restaurants, and the like). Alternatively or additionally, a vehicle having a high level of autonomy may receive this data from other vehicles having a high level of autonomy. The vehicles having a high level of autonomy may also generate a high-definition three-dimensional mapping of various geographic areas.

Thereafter, in response to receiving one or more queries about traffic conditions or these points of interest from another vehicle (e.g., a vehicle having a low level of autonomy), the vehicle having a high level of autonomy may identify the data to the query, convert it to a format that is compatible with the components of the querying vehicle, and transmit the converted data to the querying vehicle.

In short, the capabilities and functionalities of various vehicles are enhanced by the system described herein, which enables vehicles having a higher level of autonomy to share data about traffic conditions, navigation, and points of interests across vast geographic areas with vehicles having a lower level of autonomy in real time. Specifically, the data sharing includes the vehicle having a high level of autonomy converting the data into a format that is accessible by and compatible with the vehicle having a low level of autonomy. In this way, vehicles having a low level of autonomy, which may not have the ability to capture real time data, real time video streams, and the like or generate high definition mapping of various geographic areas, may nonetheless be able to access such information in real time.

FIG. 1 schematically depicts a system for transmitting data between vehicles within a network, according to one or more embodiments shown and described herein. In embodiments, a system 100 includes vehicles 102, 104, 106, 108, and 110 that have a high level of autonomy, vehicles 112, 114, 116, and 118 having a low level of autonomy, and a management server 240 (not shown in FIG. 1, but depicted in FIG. 2). A level of autonomy may be one of level 0 through level 5. Level 0 indicates no driving automation. Level 1 is the lowest level of autonomy and level 5 is the highest level of autonomy. For example, a vehicle having a level 1 of autonomy features a single automated system, e.g., monitoring speed through cruise control. A vehicle having a level 2 of autonomy performs steering and acceleration. A vehicle having a level 3 of autonomy may include environmental detection capabilities. A vehicle having a level 4 of autonomy may perform all driving tasks under specific circumstances. A vehicle having a level 5 of autonomy may have full automation that performs all driving tasks under all conditions. In the present example, vehicles 102, 104, 106, 108, and 110 may have a level 4 of autonomy, and vehicles 112, 114, 116, and 118 may have a level 3 or less of autonomy. The management server 240 may be a local server including, but not limited to, roadside unit, an edge server, and the like. In embodiments, the management server 240 may be a remote server such as a cloud server.

Each of the vehicles 102, 104, 106, 108, and 110 may be a vehicle including an automobile or any other passenger or non-passenger vehicle such as, for example, a terrestrial, aquatic, and/or airborne vehicle. In embodiments, one or more of the vehicles 102, 104, 106, 108, and 110 may be an unmanned aerial vehicle (UA), commonly known as a drone. In embodiments, one or more of the vehicles 102, 104, 106, 108, and 110 are unmanned vehicles that is capable of operating on city streets, highways, roadways, and the like. In contrast, vehicles having a low level of autonomy (e.g., 112, 114, 116, and 118) may have fewer sensors and components with limited capabilities and/or functionalities relative to the components of vehicles having a high level of autonomy. In embodiments, the vehicles having a low level of autonomy may only have motions sensors and audio sensors, and one or more processors that facilitate only the reading and writing of data.

The vehicles 102, 104, 106, 108, and 110 are vehicles that are capable of communicating with one or more external vehicles and/or devices. Additionally, each of the vehicles 102, 104, 106, 108, and 110 are capable of navigating a particular environment with limited human input or without human input. The vehicles are equipped with internet access and share data with other devices both inside and outside these vehicles. The vehicles can also communicate with management server 240. In embodiments, the management server 240 may communicate with all of the vehicles within a specified geographic area covered by the management server 240. The management server 240 may also communicate with other servers that cover different geographic areas. The management server 240 (e.g., a local server including, but not limited to, roadside unit, an edge server, and the like) may communicate with a remote server and transmit information collected by the management server 240 to the remote server. Alternatively or additionally, as stated above, the management server 240 may be the remote server such as a cloud server.

In FIG. 1, the vehicles 102, 104, 106, 108, and 110 are depicted as operating on a three-lane street. In embodiments, the vehicles 102, 104, 106, 108, and 110 are capable of gathering various types of data in real time from their environment and communicating the captured data to other vehicles. For example, in embodiments, vehicles 102, 104, 106, 108, and 110 include sensors that are used to capture images in real time, live video streams, real time motion of various objects (e.g., vehicles, pedestrians, etc.) within a certain geographic area. For example, the vehicle 102 in FIG. 1 may include cameras installed in various parts of the vehicle that capture images of other vehicles in adjacent lanes, in addition to vehicles that are located in front of and behind these vehicles. The sensors may also include audio sensors capture audio data that can then be used to determine the number of vehicles that are on the street, which in turn helps determine traffic patterns. In embodiments, the vehicle 102 may communicate, via wireless network 250, the captured data to the vehicles 104, 106, 108, 110, 112, 114, 116, and 118 in simultaneous or in a sequential order. The vehicle 102 may also request data from the other vehicles such as data regarding vehicles or other objects that are beyond the range of the sensors installed on the vehicle 102. This data may be then be converted and transmitted to one or more of vehicles 112, 114, 116, and 118.

For example, the vehicle 102 may simultaneously transmit messages (e.g., a broadcast signal) requesting a count of the number of vehicles that are within the vicinity of each of the other vehicles 104-110 (e.g., in all adjacent lanes, immediately behind, and so forth). Alternatively or additionally, the vehicle 102 may transmit a message to the vehicle 110 inquiring about road conditions a certain distance ahead. In FIG. 1, as the vehicle 110 is located a certain distance ahead of the vehicle 102, the vehicle 110 is in the best position among all of these vehicles to determine whether there is a traffic jam a certain distance ahead of the vehicle 110. Similarly, the vehicle 102 may inquire whether an accident or traffic jam has occurred a certain distance behind the vehicle 104, which is best suited to determine this information among all of the vehicles 102-110, as all of the vehicles in this cluster are ahead of the vehicle 104. After receiving responses from one or more of the vehicles 104, 106, 108, and 110, the vehicle 102 may convert the data included in the received responses and transmit this data to one or more of the vehicles 112, 114, 116, and 118.

Figure 2:
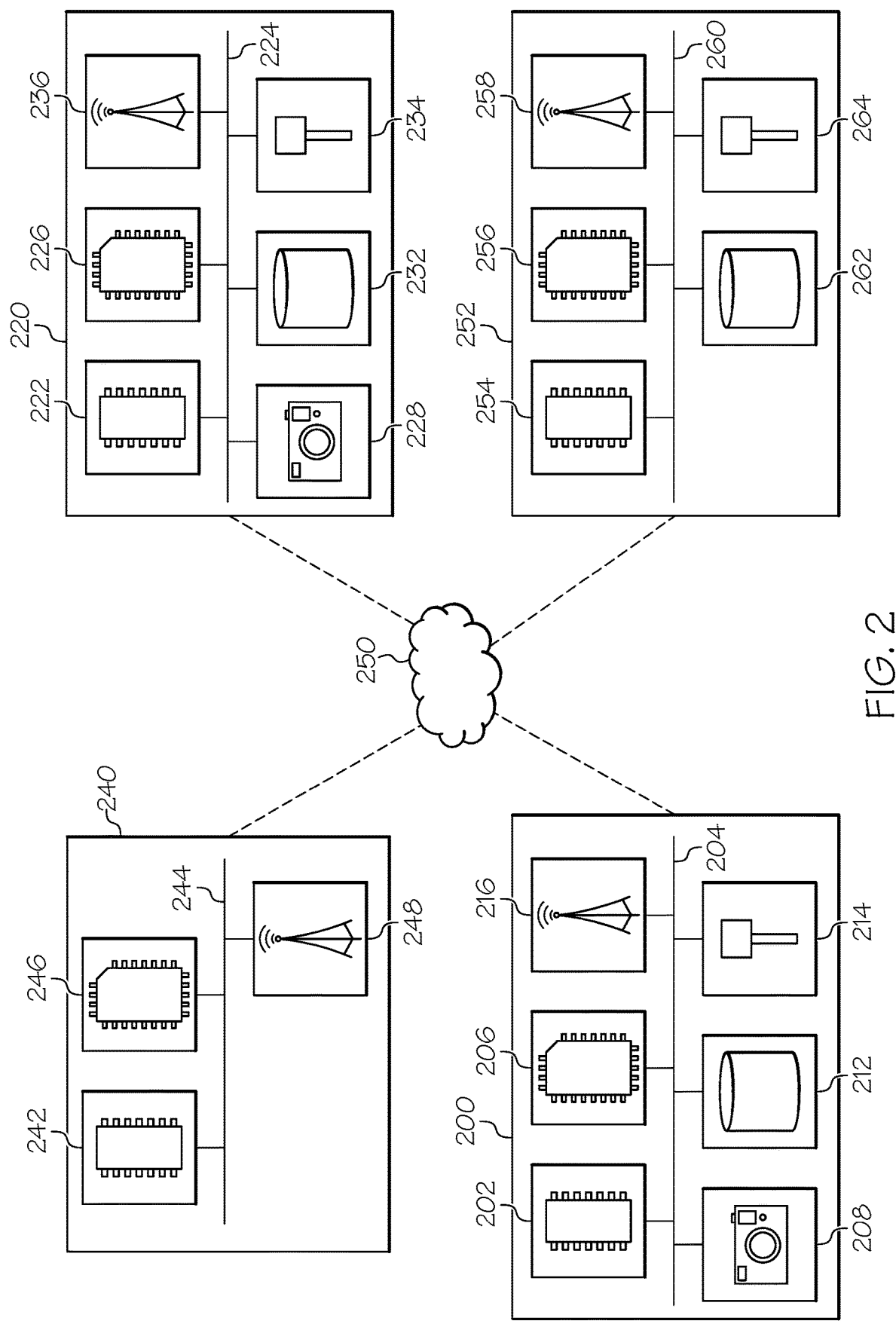
FIG. 2 schematically depicts non-limiting exemplary components in vehicles having varying levels of autonomy, according to one or more embodiments shown and described herein.

FIG. 2 schematically depicts a system for enhancing the data access capabilities of various vehicles, according to one or more embodiments shown and described herein. In one embodiment, the system for transmitting data between vehicles includes a first high level autonomous vehicle system 200, a second high level autonomous vehicle system 220, a management server 240, and a low level autonomous vehicle system 252. In this embodiment, each of the first high level autonomous vehicle system 200, the second high level autonomous vehicle system 220, the management server 240, and the low level autonomous vehicle system 252 may share data with each other via wireless network 250.

It is noted that, while two high level autonomous vehicle systems 200 and 220 and a low level autonomous vehicle system 252 are depicted, embodiments can include numerous high level autonomous vehicle systems and/or low level autonomous vehicle systems capable of communicating with each another and/or the management server 240 via the wireless network 250. In embodiments, high level and low level autonomous vehicle systems and the management server serve as nodes in a connected distributed network such that each node is capable of sharing data with one or more of the other nodes via the wireless network 250.

It is further noted, that while the first high level autonomous vehicle system 200 and the second high level autonomous vehicle system 220 are depicted in isolation, each of these systems may be included within a vehicle in embodiments, for example, respectively within each of the vehicles 102, 104, 106, 108, and 110 of FIG. 1. Additionally, the low level autonomous vehicle system 252 may be included respectively within each of the vehicles 112, 114, 116, and 118 of FIG. 1. The vehicles within which these systems may be included may be an automobile or any other passenger or non-passenger vehicle such as, for example, a terrestrial, aquatic, and/or airborne vehicle. In embodiments, these vehicles that navigates various environments with limited human input or without human input.

The first high level autonomous vehicle system 200 includes one or more processors 202. Each of the one or more processors 202 may be any device capable of executing machine readable and executable instructions. Accordingly, each of the one or more processors 202 may be a controller, an integrated circuit, a microchip, a computer, or any other computing device. The one or more processors 202 are coupled to a communication path 204 that provides signal interconnectivity between various modules of the system. Accordingly, the communication path 204 may communicatively couple any number of processors 202 with one another, and allow the modules coupled to the communication path 204 to operate in a distributed computing environment. Specifically, each of the modules may operate as a node that may send and/or receive data. As used herein, the term "communicatively coupled" means that coupled components are capable of exchanging data signals with one another such as, for example, electrical signals via conductive medium, electromagnetic signals via air, optical signals via optical waveguides, and the like.

Accordingly, the communication path 204 may be formed from any medium that is capable of transmitting a signal such as, for example, conductive wires, conductive traces, optical waveguides, or the like. In embodiments, the communication path 204 may facilitate the transmission of wireless signals, such as WiFi, Bluetooth®, Near Field Communication (NFC) and the like. Moreover, the communication path 204 may be formed from a combination of mediums capable of transmitting signals. In one embodiment, the communication path 204 comprises a combination of conductive traces, conductive wires, connectors, and buses that cooperate to permit the transmission of electrical data signals to components such as processors, memories, sensors, input devices, output devices, and communication devices. Accordingly, the communication path 204 may comprise a vehicle bus, such as for example a LIN bus, a CAN bus, a VAN bus, and the like. Additionally, it is noted that the term "signal" means a waveform (e.g., electrical, optical, magnetic, mechanical or electromagnetic), such as DC, AC, sinusoidal-wave, triangular-wave, square-wave, vibration, and the like, capable of traveling through a medium.

The first high level autonomous vehicle system 200 includes one or more memory modules 206 coupled to the communication path 204. The one or more memory modules 206 may comprise RAM, ROM, flash memories, hard drives, or any device capable of storing machine readable and executable instructions such that the machine readable and executable instructions can be accessed by the one or more processors 202. The machine readable and executable instructions may comprise logic or algorithm(s) written in any programming language of any generation (e.g., 1GL, 2GL, 3GL, 4GL, or 5GL) such as, for example, machine language that may be directly executed by the processor, or assembly language, object-oriented programming (OOP), scripting languages, microcode, etc., that may be compiled or assembled into machine readable and executable instructions and stored on the one or more memory modules 206. Alternatively, the machine readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The one or more memory modules 206 may include machine readable instructions that, when executed by the one or more processors 202, obtain data using sensors of the first high level autonomous vehicle system 200, receive a request for data from a low level autonomous vehicle system 252, and transmit the data to the low level autonomous vehicle system 252 in exchange for consideration. In embodiments, the details of the manner in which data is transmitted from the first high level autonomous vehicle system 200 to the low level autonomous vehicle system 252 is detailed in FIGS. 4A and 4B.

Referring still to FIG. 2, the first high level autonomous vehicle system 200 comprises one or more sensors 208. The one or more sensors 208 may be any device having an array of sensing devices capable of detecting radiation in an ultraviolet wavelength band, a visible light wavelength band, or an infrared wavelength band. The one or more sensors 208 may have any resolution. In embodiments, one or more optical components, such as a mirror, fish-eye lens, or any other type of lens may be optically coupled to the one or more sensors 208. In embodiments described herein, the one or more sensors 208 may provide image data to the one or more processors 202 or another component communicatively coupled to the communication path 204. The image data may include real time image data, live video stream data, and the like. For example, the image data and/or live video stream data may include data related to the location and speed of vehicles located in adjacent lanes, and in front of and behind the vehicle having the first high level autonomous vehicle system 200. In embodiments, the one or more sensors 208 may also provide navigation support. That is, data captured by the one or more sensors 208 may be used to help in vehicle navigation (e.g., navigation of vehicles 102, 104, 106, 108, 110, 112, 114, 116, and 118).

In embodiments, the one or more sensors 208 include one or more imaging sensors configured to operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image. Ranging sensors like radar may be used to obtain a rough depth and speed information for the view of the first high level autonomous vehicle system 200. The first high level autonomous vehicle system 200 may capture real time image data, live video stream data, and the like of the surrounding environments or areas within a certain proximity of the vehicle using one or more imaging sensors. The one or more processors 202 may analyze the captured data to generate a high definition three dimensional mappings.

In operation, the one or more sensors 208 capture image data and communicate the image data to the one or more processors 202 and/or to other systems communicatively coupled to the communication path 204. The image data may be received by the one or more processors 202, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms. Additionally, the one or more sensors 208 include The first high level autonomous vehicle system 200 comprises a satellite antenna 214 coupled to the communication path 204 such that the communication path 204 communicatively couples the satellite antenna 214 to other modules of the first high level autonomous vehicle system 200. The satellite antenna 214 is configured to receive signals from global positioning system satellites. Specifically, in one embodiment, the satellite antenna 214 includes one or more conductive elements that interact with electromagnetic signals transmitted by global positioning system satellites. The received signal is transformed into a data signal indicative of the location (e.g., latitude and longitude) of the satellite antenna 214 or an object positioned near the satellite antenna 214, by the one or more processors 202.

The first high level autonomous vehicle system 200 comprises one or more vehicle sensors 212. Each of the one or more vehicle sensors 212 is coupled to the communication path 204 and communicatively coupled to the one or more processors 202. The one or more vehicle sensors 212 may include one or more motion sensors for detecting and measuring motion and changes in motion of the vehicle. The motion sensors may include inertial measurement units. Each of the one or more motion sensors may include one or more accelerometers and one or more gyroscopes. Each of the one or more motion sensors transforms sensed physical movement of the vehicle into a signal indicative of an orientation, a rotation, a velocity, or an acceleration of the vehicle. Additionally, the one or more vehicle sensors 212 may include audio sensors that are capable of detecting various sounds, ambient noises, and the like within a predetermined proximity of the vehicle.

Still referring to FIG. 2, the first high level autonomous vehicle system 200 comprises network interface hardware 216 for communicatively coupling the first high level autonomous vehicle system 200 to the second high level autonomous vehicle system 220, the management server 240, and/or the low level autonomous vehicle system 252. The network interface hardware 216 can be communicatively coupled to the communication path 204 and can be any device capable of transmitting and/or receiving data via a network. Accordingly, the network interface hardware 216 can include a communication transceiver for sending and/or receiving any wired or wireless communication. For example, the network interface hardware 216 may be configured as part of a data communication module (DCM) and include an antenna, a modem, LAN port, Wi-Fi card, WiMax card, mobile communications hardware, near-field communication hardware, satellite communication hardware and/or any wired or wireless hardware for communicating with other networks and/or devices. In one embodiment, the network interface hardware 216 includes hardware configured to operate in accordance with the Bluetooth® wireless communication protocol. The network interface hardware 216 of the first high level autonomous vehicle system 200 may transmit its data to the management server 240. For example, the network interface hardware 216 of the first high level autonomous vehicle system 200 may transmit captured images, a live video stream, a high definition three dimensional mapping of one or more areas, and the like to other vehicles and/or or the management server 240.

The first high level autonomous vehicle system 200 may connect with one or more external vehicles and/or external processing devices (e.g., the management server 240) via a direct connection. The direct connection may be a vehicle-to-vehicle connection ("V2V connection") or a vehicle-to-everything connection ("V2X connection"). The V2V or V2X connection may be established using any suitable wireless communication protocols discussed above. A connection between vehicles may utilize sessions that are time-based and/or location-based. In embodiments, a connection between vehicles or between a vehicle and an infrastructure element may utilize one or more networks to connect (e.g., the wireless network 250), which may be in lieu of, or in addition to, a direct connection (such as V2V or V2X) between the vehicles or between a vehicle and an infrastructure. By way of non-limiting example, vehicles may function as infrastructure nodes to form a mesh network and connect dynamically on an ad-hoc basis. In this way, vehicles may enter and/or leave the network at will, such that the mesh network may self-organize and self-modify over time. Other non-limiting network examples include vehicles forming peer-to-peer networks with other vehicles or utilizing centralized networks that rely upon certain vehicles and/or infrastructure elements. Still other examples include networks using centralized servers and other central computing devices to store and/or relay information between vehicles.

Still referring to FIG. 2, the first high level autonomous vehicle system 200 may be communicatively coupled to the management server 240 by the wireless network 250. In one embodiment, the wireless network 250 may include one or more computer networks (e.g., a personal area network, a local area network, or a wide area network), cellular networks, satellite networks and/or a global positioning system and combinations thereof. Accordingly, the first high level autonomous vehicle system 200 can be communicatively coupled to the wireless network 250 via a wide area network, via a local area network, via a personal area network, via a cellular network, via a satellite network, etc. Suitable local area networks may include wired Ethernet and/or wireless technologies such as, for example, wireless fidelity (Wi-Fi). Suitable personal area networks may include wireless technologies such as, for example, IrDA, Bluetooth®, Wireless USB, Z-Wave, ZigBee, and/or other near field communication protocols. Suitable cellular networks include, but are not limited to, technologies such as LTE, WiMAX, UMTS, CDMA, and GSM.

Still referring to FIG. 2, the management server 240 includes one or more processors 242, one or more memory modules 246, network interface hardware 248, and a communication path 244. The one or more processors 242 may be a controller, an integrated circuit, a microchip, a computer, or any other computing device. The one or more memory modules 246 may comprise RAM, ROM, flash memories, hard drives, or any device capable of storing machine readable and executable instructions such that the machine readable and executable instructions can be accessed by the one or more processors 242. The communication path 244 may be similar to the communication path 204 in some embodiments.

Still referring to FIG. 2, the second high level autonomous vehicle system 220 includes one or more processors 222, one or more memory modules 226, one or more sensors 228, one or more vehicle sensors 232, a satellite antenna 234, network interface hardware 236, and a communication path 224 communicatively connected to the other components of the second high level autonomous vehicle system 220. The components of the second high level autonomous vehicle system 220 may be structurally similar to and have similar functions as the corresponding components of the first high level autonomous vehicle system 200 (e.g., the one or more processors 222 correspond to the one or more processors 202, the one or more memory modules 226 correspond to the one or more memory modules 206, the one or more sensors 228 correspond to the one or more sensors 208, the one or more vehicle sensors 232 correspond to the one or more vehicle sensors 212, the satellite antenna 234 corresponds to the satellite antenna 214, the network interface hardware 236 corresponds to the network interface hardware 216, and the communication path 224 corresponds to the communication path 204).

Still referring to FIG. 2, the low level autonomous vehicle system 252 includes one or more processors 254, one or more memory modules 256, one or more vehicle sensors 262, a satellite antenna 264, network interface hardware 258, and a communication path 224 communicatively connected to the other components of the low level autonomous vehicle system 252. It is noted that the components of the low level connected vehicle system share structural similarities with and have some similar functions as the corresponding components of the first and second high level autonomous vehicle systems 200 and 220, but have some fundamental differences.

In particular, the low level autonomous vehicle system 252 may not, e.g., have sensors with the capabilities and/or functionalities to capture images in real time or a live video stream, generate a high definition three-dimensional mapping of an area, and the like. Instead, the low level autonomous vehicle system 252 may simply have one or more vehicle sensors 262 that include one or more motion sensors for detecting and measuring motion and changes in motion of the vehicle. The motion sensors may include inertial measurement units. Additionally or alternatively the one or more vehicle sensors may include one or more accelerometers and one or more gyroscopes. Each of the one or more motion sensors may transform sensed physical movement of the vehicle into a signal indicative of an orientation, a rotation, a velocity, or an acceleration of the vehicle.

In embodiments, the network interface hardware 258 of the low level autonomous vehicle system 252 may receive data from the first high level autonomous vehicle system 200, the second high level autonomous vehicle system 220, and/or the management server 240 in a format that is compatible with components of the low level autonomous vehicle system 252. In embodiments, the network interface hardware 258 may receive data related to, e.g., traffic conditions, in an audio format (e.g. an audio file) or a text message, which accessible by and compatible with the components of the low level autonomous vehicle system 252.

In embodiments, the audio file received by the network interface hardware 258 may be transferred to the one or more processors 254 via communication path 260. The one or more processors 254 may then process the audio file such that the contents of the audio file may be output via one more speakers (not shown) of the vehicle in which the low level autonomous vehicle system 252 is installed. Alternatively or additionally, a text message received by the network may be transferred to the one or more processors 254 via communication path 260. The one or more processors 254 may then process the text message such that the message may displayed on a user interface of the vehicle.

The operation of the one or more processors 254 corresponds to the one or more processors 202, the one or more memory modules 256 correspond to the one or more memory modules 206, the satellite antenna 264 corresponds to the satellite antenna 214, the one or more vehicle sensors 262 correspond to the one or more vehicle sensors 212, the network interface hardware 258 corresponds to the network interface hardware 216, and the communication path 224 corresponds to the communication path 204.

Figure 3:
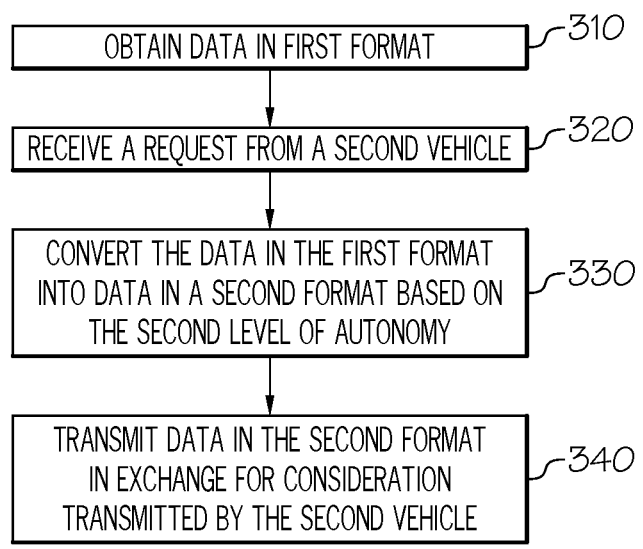
FIG. 3 depicts a flowchart for a vehicle transmitting data that is converted into a format compatible with and accessible by another vehicle.

FIG. 3 depicts a flowchart 300 for enhancing the data access capabilities of various vehicles, according to one or more embodiments shown and described herein. A discussion of FIGS. 4A and 4B will be interspersed with the discussion on FIG. 3.

In step 310, a first high level autonomous vehicle system 200 may obtain data in a first format. In embodiments, by referring to FIGS. 2 and 4A, the first high level autonomous vehicle system 200 that is installed in a first vehicle 400 may capture, using one or more cameras, a live video stream and/or an audio stream of an environment surrounding the first vehicle, e.g., a predefined radius of the vehicle. For example, the first vehicle 400 may capture a live stream that includes images, in real time, of vehicles that are in adjacent lanes, behind, and in front of this vehicle, and the like. In embodiments, the system in the first vehicle 400 may utilize cameras, motion sensors, and/or audio sensors to detect persons (e.g. pedestrians), animals, construction barriers, emergency road kits, and the like of an environment surrounding the first vehicle. In embodiments, the system in the first vehicle 400 may also utilize cameras to capture data related to various points of interest as the vehicle travels within a city, e.g., theaters, malls, parking lots, restaurants, and the like. This data may be stored in a particular format after being captured. In embodiments, the first vehicle 400 is a vehicle with a high level of autonomy. In other words, the first vehicle 400 is a vehicle with a number of functionalities such as high definition cameras that are used to capture real time images and live video streams, motion sensors and audio sensors that capture pedestrian and animal movements in real time, sensors that are capable of communicating with traffic lights, and a combination of hardware and software that enable these vehicles to communicate and share data with other vehicles and the management server, e.g., via the wireless network 250.

Referring back to FIG. 3, in step 320, the system in the first vehicle 400 may receive a query from a second vehicle 402, which may be a vehicle having a low level of autonomy with the low level autonomous vehicle system 252 installed therein, as depicted in FIG. 2. The query received by the first vehicle 400 may be, e.g., a query regarding traffic conditions a certain distance away from the second vehicle 402, e.g., within a predefined time frame. In embodiments, the first vehicle 400 may determine that it has data that is relevant to the query, e.g., based on data obtained via one or more of the sensors included in the first vehicle 400. Alternatively, the first vehicle 400 may determine that it does not have the answer to the query, and as such, may transmit the query received from second vehicle 402 to other vehicles and/or the management server 240 in order to gather additional data.

For example, as shown FIG. 4A, first vehicle 400 may receive a query from second vehicle 402 via wireless network 250, inquiring about traffic conditions (e.g., roadblocks, traffic jams, accidents, delays, and the like) a certain distance away from the second vehicle 402. The first vehicle 400 may access data stored in memory and search this data to determine the answer to the received query. In embodiments, the first vehicle 400 may determine that it does not have the answer to the received query, and as such, may transmit the query (or some version of the received query) to third, fourth, and fifth vehicles 404, 406, and 408, and/or the management server 240. Each of the vehicles 404, 406, and 408 may be vehicles having a high level of autonomy, with sensors and functionalities comparable to the first vehicle 400.

In embodiments, as shown in FIG. 4A, the third vehicle 404 may receive a query from the first vehicle 400 inquiring about traffic conditions, namely traffic conditions in an area a certain distance away from the second vehicle 402, and/or in a geographic area further away from the second vehicle 402. The third vehicle 404 may search data stored in memory (locally or in the cloud) and transmit a response to the query to the first vehicle 400, e.g., a first response 412 as depicted in FIG. 4A. Alternatively or additionally, the third vehicle 404 may transmit the query to one or more additional vehicles to determine the traffic conditions. The format of the response provided by the third vehicle 404 ("first response 412") may be, a high definition three dimensional mapping of an area, a live video stream of an area, an image of an area, a text response or audio response (e.g., "information unavailable", "no traffic ahead", "traffic jam ahead", "roadblocks ahead", "delays caused by accidents", etc.), or a combination of one or more of these responses. In embodiments, the third vehicle 404 may provide the response in real time or within a predefined time frame to the first vehicle 400, e.g., depending on the proximity of the third vehicle 404 to the area regarding which the second vehicle 402 is inquiring, the time it takes for the third vehicle 404 to gather information from other vehicles, search a database, and the like.

The first vehicle 400 may also transmit the query received by the second vehicle 402 to fourth and fifth vehicles 406 and 408, and management server 240 as well. Similar to the third vehicle 404, fourth and fifth vehicles 406 and 408, and the management server 240 may search data stored in various databases (locally or in the cloud), communicate with other vehicles and/or the management server 240 in order to obtain traffic data. The responses received by the fourth and fifth vehicles 406 and 408, and the management server 240 would then be transmitted to the first vehicle 400. In embodiments, these responses may be high definition three dimensional mappings, live video streams or an images, text and/or audio responses (e.g., "yes" or "no", "no traffic ahead", "traffic jam ahead", "roadblocks ahead", "delays caused by accidents", etc.).

In embodiments, the first vehicle 400 may analyze the responses received from each of the vehicles 404, 406, and 408, and the management server 240 and determine that the most accurate response to the query is the one received by second vehicle 402. As depicted in FIG. 4A, the most relevant and accurate response may be first response 412 received from third vehicle 404. The second, third, and fourth responses 414, 416, and 418 received from vehicles 406, 408, and the management server 240, respectively, may be outdated data, inaccurate data, corrupted data, or data indicating that the relevant traffic information is unavailable.

In embodiments, as shown in FIG. 4B, the second vehicle 402 may transmit multiple queries to the first vehicle 400. For example, the second vehicle 402 may transmit a second query 422 regarding whether parking is available near a baseball stadium, and a third query 424 regarding, e.g., the hours of operation of the ticket counter at the stadium. Both these queries may be simultaneously or sequentially transmitted from the second vehicle 402 to the first vehicle 400. In embodiments, the first vehicle 400 determines that it does not have data relevant to these queries, and as such, to obtain data related to these queries, may transmit these queries to other vehicles.

As shown in FIG. 4B, the first vehicle 400 may transmit the second and third queries to the vehicles 404, 406, and 408, and the management server 240, and receive multiple responses. For example, in response to the second query 422, the third vehicle 404 may transmit a real time image or a live video stream of the parking lot adjacent to the stadium (fifth response 426), indicating multiple available parking spots available. In addition, the fourth vehicle 406 may transmit an image of multiple available parking spots on a street adjacent to the stadium entrance (sixth response 428). The first vehicle 400 may determine that the responses from the vehicles 404 and 406 are accurate and relevant. The management server 240 may transmit outdated data indicating that the parking lot and the streets near the stadium are under construction, while the fifth vehicle 408 may transmit data indicating that the vehicle is not in the immediate vicinity of the stadium, and as such, does not have data relevant to the second query 422. The first vehicle 400 may determine that the responses to the second query 422 received from the vehicle 408 and the management server 240 are inaccurate.

Further, in response to the third query 424, the management server 240 may transmit an image indicating the hours of operation of the ticket counter. In embodiments, the vehicles 404, 406, and 408, may not transmit a response to this query or may transmit responses indicating that they do not have the relevant data regarding the hours of operation of the ticket counter.

Referring back to FIG. 3, in step 330, the first vehicle 400 may convert data received in a particular format (e.g., the first format) into data in a second format. The manner in which the data is converted from a first format into a second format by the first vehicle 400 is described with respect to the example embodiments depicted in FIGS. 4A and 4B.

Referring to the example depicted in FIG. 4A, the first vehicle 400 may receive first, second, third, and fourth responses 412, 414, 416, and 418 from each of vehicles 404, 406, and 408, and the management server 240 respectively. These responses may be, e.g., a high definition three dimensional mapping of an area, a live video stream of an area, an image of an area, a text response or audio response, and the like. In embodiments, the first vehicle 400 may determine that only one of these responses (e.g., the first response 412) is the relevant response. The first vehicle 400 may determine that the first response 412 received from the third vehicle 404 provides the most accurate data relating to traffic conditions that are a certain distance away from the second vehicle 402. However, this response may be in the format of an image or live video stream, which is incompatible with or inaccessible by the sensors and functionalities of the second vehicle 402, as the second vehicle 402 may one having a low level of autonomy. As such, the first vehicle 400 converts the data included in the first response 412 into a particular format based on the capabilities and functionalities of the second vehicle 402. For example, the first vehicle 400 may convert the data included in the first response into text or audio format such that the converted data may state, e.g., "traffic jam in two miles" or "delays due to an accident in two miles".

Referring to the example depicted in FIG. 4B, as previously stated, the first vehicle 400 may receive multiple responses to second and third queries, which relate to the availability of parking near the baseball stadium, and the hours of operation of the ticket counter at the stadium. The first vehicle 400 may determine that the response received from the third vehicle 404 (fifth response 426) and the response received from the vehicle 408 (sixth response 428) include relevant data relating to the availability of parking near the baseball stadium. As such, the first vehicle 400 may combine or concatenate these responses for transmission to the second vehicle 402. Further, the first vehicle 400, may determine that, as the second vehicle 402 is a vehicle with a low level of autonomy, the data included in the fifth and sixth responses 426 and 428 will have to be converted into a different format, e.g., a format that is accessible by and compatible with the capabilities and functionalities of the sensors (and other components) included in the second vehicle 402.

For example, with respect to the second query 422 relating to parking availability, the first vehicle 400 may convert the data relating to the available parking spaces in the live video streams of the parking lot and the street outside the stadium into audio or text. The first vehicle 400 may convert the fifth and sixth responses 426 and 428 received from the vehicles 404 and 406 into audio or messages, e.g., "parking is available in the parking lot on the south east corner of the stadium" and "parking is available on the north east corner of Smith Street".

In another example, with respect to the third query relating to the hours of operation of the ticket counter, the management server 240 may transmit an image indicating the hours of operation of the ticket counter (seventh response 430). The first vehicle 400 may determine that, as the second vehicle 402 is a vehicle with a low level of autonomy, the image of indicating the hours of operation (seventh response 430) will have to be converted into a second format, e.g., text or audio format. As such, the first vehicle 400 may extract data included in the image and convert into text or audio, e.g., "the ticket counter is open from 8:30 AM to 9:00 PM". In embodiments, the first vehicle 400 may not receive any response from the fifth vehicle 408.

Referring back to FIG. 3, in step 340, the first vehicle 400 may transmit data that is converted from a first format into a second format to the second vehicle 402 in exchange for consideration transmitted by the second vehicle 402.

Referring to FIG. 4A, for example, the converted response that is determined to be the most accurate one (the first response received from the third vehicle 404, which is a live stream of traffic conditions a certain distance away from the second vehicle 402) may be transmitted to the second vehicle 402. For example, the first vehicle 400 may transmit the response as an audio file to the second vehicle 402. Upon receipt, the second vehicle 402 may utilize its speakers to play the audio file such that it is audible to the passengers in the vehicle. In embodiments, the passengers in the vehicle may hear "traffic jam in two miles" or "delays due to an accident in two miles". It is noted that the converted response 420 is transmitted to the second vehicle 402 in exchange for consideration transmitted by the second vehicle 402, which is depicted in detail in FIGS. 5A and 5B.

Referring to FIG. 4B, for example, the first vehicle 400 may determine that the fifth and sixth responses 426 and 428 received in response to the query relating to parking available near a stadium (second query 422) are accurate. As such, the first vehicle 400 may concatenate or combine these responses, convert them into an audio format (e.g., audio file) and transmit the audio file to the second vehicle 402. Upon receipt, the second vehicle 402 may utilize its speakers to play the audio file such that it is audible to the passengers in the vehicle. In embodiments, the passengers in the vehicle may hear "parking is available in the parking lot on the south east corner of the stadium" and "parking is available on the north east corner of Smith Street". Referring to FIG. 4B, the first vehicle 400 may determine that the seventh response 430 received from the management server 240 is accurate. As such, the first vehicle 400 may convert this response from a first format into a second format, e.g., convert data in an image file into an audio file and transmit the audio file to the second vehicle 402. Upon receipt, the second vehicle 402 may utilize its speakers to play the audio file such that it is audible to the passengers in the vehicle, e.g., the passengers may hear "the ticket counter is open from 8:30 AM to 9:00 PM".

Figure 5B:
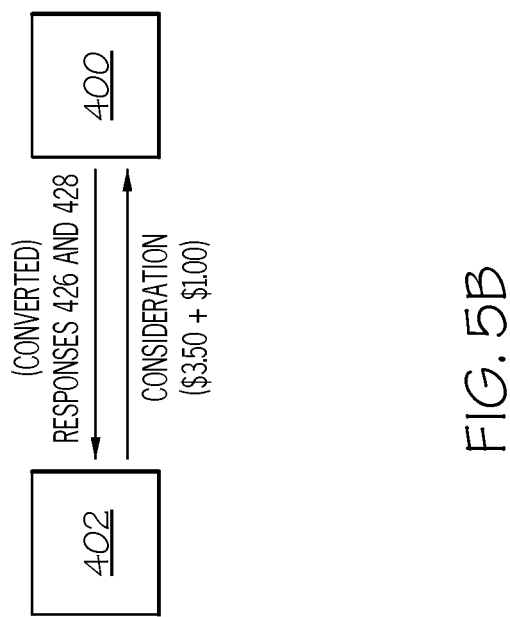
FIG. 5B depicts other examples of consideration transmitted by vehicles in exchange for receiving converted data, according to one or more embodiments shown or described herein.
Figure 5A:
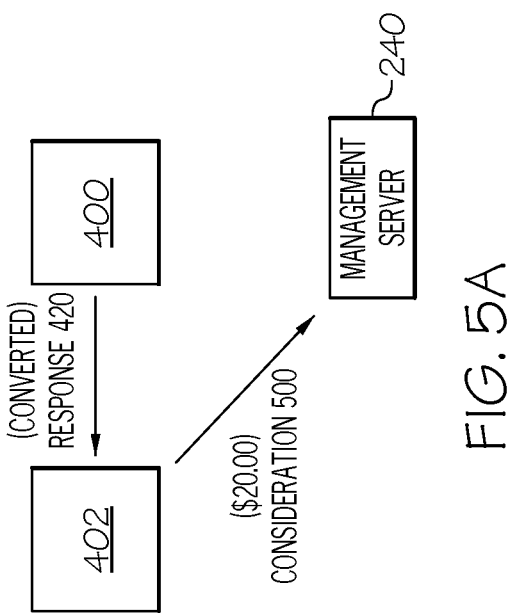
FIG. 5A depicts examples of consideration transmitted by vehicles in exchange for receiving converted data, according to one or more embodiments shown or described herein.

The type and manner of the consideration that is transmitted is by the second vehicle 402 in exchange for data received from the first vehicle 400 is described in detail in FIGS. 5A and 5B.

As shown in FIG. 5A, the second vehicle 402 may transmit, in exchange for data received from the first vehicle 400, consideration in the form of a payment made using traditional currencies, e.g., a monthly subscription payment (e.g., $20.00) to a network subscription service associated with the management server 240. Alternatively or additionally, as shown in FIG. 5B, the second vehicle 402 may transmit a payment directly to the first vehicle 400 specifically for data that is related to a query. For example, the second vehicle 402 may transmit a payment in the amount of $3.50 in exchange for data relating to traffic conditions and $1.0 for data relating to the availability of parking near the stadium. It is further noted that consideration could also include payments made using cryptocurrencies, e.g., bitcoin, litecoin, ethereum, and the like. Alternatively or additionally, consideration may be data that is transmitted from the second vehicle 402 to the first vehicle 400 in return for data from the first vehicle 400. Alternatively or additionally, consideration may be data that is transmitted from the second vehicle 402 to the management server 240 in return for data received from the first vehicle 400 to the second vehicle 402. Alternatively or additionally, consideration may be data that is transmitted from the second vehicle 402 to the management server 240 in return for data that may be received from the management server 240.

It should be understood that embodiments described herein are directed to systems and methods for tracking and communicating with various vehicles. The present system utilizes sensors installed (e.g., cameras, GPS devices, radar sensors, LIDAR sensors, and the like) to monitor a nearby vehicle in real-time. The vehicle feature information extracted from the images that are captured by the cameras installed in the vehicles. These images may be shared among these vehicles via, e.g., a wireless network. In addition, the driving patterns vehicles within a predetermined proximity may be monitored by various vehicles.

According to the present disclosure, the capabilities and functionalities of various vehicles are enhanced, which enables vehicles having a higher level of autonomy to share data about traffic conditions, navigation, and points of interests across vast geographic areas with vehicles having a lower level of autonomy and other comparable vehicles in real time. Specifically, the data sharing includes the vehicle having a high level of autonomy converting the data into a format that is accessible by and compatible with the vehicle having a low level of autonomy. Consequently, vehicles having a low level of autonomy, which may not have the ability to capture real time data, real time video streams, and the like or generate high definition mapping of various geographic areas, may nonetheless be able to access some version of and the content in the data in real time.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A system for enhancing data access capabilities between vehicles, the system comprising:
   a first vehicle having a first level of autonomy corresponding to a first set of capabilities and comprising a first controller and a first set of sensors, wherein the first controller is configured to:
      obtain data using the first set of sensors,
      receive a request for the data and an additional request for additional data from a second vehicle, the second vehicle comprising a second controller and a second set of sensors, the first vehicle and the second vehicle are part of a distributed network,
      convert the data from a first format into a second format, wherein the second format is compatible with the second vehicle having a second level of autonomy, the second level of autonomy corresponding to a second set of capabilities that are lower than the first set of capabilities,
      receive, responsive to the additional request, a portion of the additional data from a third vehicle and a different portion of the additional data from a fourth vehicle, the portion from the third vehicle is in a third format and the different portion from the fourth vehicle is in a fourth format, the third vehicle and the fourth vehicle are part of the distributed network,
      convert the portion from the third format into the second format and the different portion from the fourth format to the second format,
      combine the portion and the different portion that are converted, and
      transmit in exchange for consideration, to the second vehicle, the data in the second format and the combination of the portion and the different portion.

2. The system of claim 1, wherein the first vehicle and the second vehicle serve as a first node and a second node of the distributed network respectively.

3. The system of claim 1, wherein the consideration includes at least one of:
   a payment in digital currency transmitted by the second vehicle to a network subscription service associated with a management server;
   a payment in a form of additional data transmitted by the second vehicle to the network subscription service associated with the management server; and
   the payment in the form of the additional data transmitted by the second vehicle to the first vehicle.

4. The system of claim 1, wherein:
   the first set of sensors include one or more of a camera, image sensors, motion sensors, audio sensors, accelerometers, and gyroscopes; and
   the second set of sensors include one or more of motion sensors, audio sensors, accelerometers, and gyroscopes.

5. The system of claim 1, wherein the first controller is configured to implement a set of functions, and one or more of the set of functions is unavailable to the second controller.

6. The system of claim 5, wherein:
   the set of functions includes:
      reading and writing data,
      storing data,
      capturing real time audio data of an environment surrounding the first vehicle,
      capturing real time motion data of the environment surrounding the first vehicle, and
      capturing real time video data of the environment surrounding the first vehicle.

7. A vehicle having a first level of autonomy corresponding to a first set of capabilities, the vehicle comprising:
   a first set of sensors; and
   a controller that is configured to:
      obtain data in a first format;
      receive a request for the data and an additional request for additional data from a second vehicle having a second level of autonomy corresponding to a second set of capabilities that are lower than the first set of capabilities, the second vehicle comprising a second controller and a second set of sensors, the vehicle and the second vehicle are part of a distributed network;
      convert the data from the first format to a second format, wherein the second format is compatible with the second vehicle having the second level of autonomy;
      receive, responsive to the additional request, a portion of the additional data from a third vehicle and a different portion of the additional data from a fourth vehicle, the portion from the third vehicle is in a third format and the different portion from the fourth vehicle is in a fourth format, the third vehicle and the fourth vehicle are part of the distributed network;
      convert the portion from the third format into the second format and the different portion from the fourth format to the second format;
      combine the portion and the different portion that are converted; and
      transmit to the second vehicle, in exchange for consideration transmitted by the second vehicle, the data in the second format and the combination of the portion and the different portion in the second format.

8. The vehicle of claim 7, wherein the consideration includes at least one of:
a payment in digital currency transmitted by the second vehicle to a network subscription service associated with a management server;
a payment in a form of additional data transmitted by the second vehicle to the network subscription service associated with the management server; and
the payment in the form of the additional data transmitted by the second vehicle to the vehicle.

9. The vehicle of claim 7, wherein:
the controller is configured to:
read and write data,
store data,
capture real time audio data of an environment surrounding the vehicle,
capture real time motion data of the environment surrounding the vehicle, and
capture real time video data of the environment surrounding the vehicle.

10. A method for enhancing data access capabilities of vehicles, the method comprising:
obtaining, by a first vehicle having a first level of autonomy corresponding to a first set of capabilities, data in a first format, the first vehicle having a first controller and a first set of sensors;
receiving a request for the data and an additional request for additional data from a second vehicle having a second level of autonomy that corresponds to a second set of capabilities that are lower than the first set of capabilities, the first vehicle and the second vehicle are part of a distributed network;
converting the data from the first format to a second format, the second format is compatible with the second level of autonomy;
receiving, responsive to the additional request, a portion of the additional data from a third vehicle and a different portion of the additional data from a fourth vehicle, the portion from the third vehicle is in a third format and the different portion from the fourth vehicle is in a fourth format, the third vehicle and the fourth vehicle are part of the distributed network;
converting the portion from the third format into the second format and the different portion from the fourth format to the second format;
combining the portion and the different portion that are converted; and
transmitting to the second vehicle, in exchange for consideration transmitted by the second vehicle, the data in the second format and the combination of the portion and the different portion in the second format.

11. The method of claim 10, wherein each of the first vehicle and the second vehicle is a first node and a second node of the distributed network respectively.

12. The method of claim 10, wherein the consideration includes at least one of:
a payment in digital currency transmitted by the second vehicle to a network subscription service associated with a management server;
a payment in the form of additional data transmitted by the second vehicle to the network subscription service associated with the management server; and
a payment in the form of additional data transmitted by the second vehicle to the first vehicle.

13. The method of claim 10, wherein:
the first set of sensors include one or more of a camera, image sensors, motion sensors, audio sensors, accelerometers, and gyroscopes; and
the second set of sensors include one or more of motion sensors, audio sensors, accelerometers, and gyroscopes.

14. The method of claim 10, wherein the first controller is configured to implement a set of functions, and one or more of the set of functions is unavailable to the second controller.

* * * * *